US005556905A

United States Patent [19]
Frappier et al.

[11] Patent Number: 5,556,905
[45] Date of Patent: Sep. 17, 1996

[54] PHYSICALLY-MODIFIED DEGRADABLE THERMOPLASTIC COMPOSITIONS

[75] Inventors: Edward P. Frappier, Kernersville; Ezekiel H. Hull, Greensboro; L. Murl Jackson, Jamestown, all of N.C.

[73] Assignee: Reilly Industries, Inc., Indianapolis, Ind.

[21] Appl. No.: 221,042

[22] Filed: Mar. 30, 1994

[51] Int. Cl.$^6$ .................... C08K 5/11; C08K 5/12
[52] U.S. Cl. .......................................... 524/311
[58] Field of Search ........................ 524/311; 560/127

[56] References Cited

U.S. PATENT DOCUMENTS

| 4,289,668 | 9/1981 | Li | 524/310 |
|---|---|---|---|
| 4,361,625 | 11/1982 | Beckmann et al. | 428/412 |
| 4,711,922 | 12/1987 | Hull et al. | 524/310 |
| 4,824,893 | 4/1989 | Hull | 524/310 |
| 5,047,464 | 9/1991 | Pogany et al. | 524/500 |
| 5,095,054 | 3/1992 | Lay et al. | 524/47 |
| 5,142,023 | 8/1992 | Gruber et al. | 528/354 |
| 5,180,765 | 1/1993 | Sinclair | 524/306 |

OTHER PUBLICATIONS

Morflex Technical Bulletin 101 Citrate Esters from Morflex, Inc. Morflex Technical Bulletin 103 Medical Grade Citroflex Plasticizers from Morflex, Inc. Jul. 14, 1991.

*Primary Examiner*—Kriellion S. Morgan
*Attorney, Agent, or Firm*—Woodard, Emhardt, Naughton Moriarty & McNett

[57] ABSTRACT

Described are degradable thermoplastic compositions which are physically modified by citrate esters and other polycarboxylic acid esters. Also described are novel citrate esters effective to provide such physical modifications, as well as methods for preparing the degradable thermoplastic compositions.

21 Claims, No Drawings

PHYSICALLY-MODIFIED DEGRADABLE THERMOPLASTIC COMPOSITIONS

BACKGROUND

The present invention relates generally to physically-modified, degradable thermoplastic compositions. More particular aspects of the invention relate to physically-modified degradable cellulosic- or polyester-based thermoplastic compositions, and ester compositions which are suitable for physically modifying such degradable thermoplastic compositions.

As further background, in recent years there have been heightened interests in using environmentally-degradable thermoplastic formulations to compete with or replace presently-used nondegradable thermoplastic formulations. Substantial academic and industrial research has accordingly been conducted on degradable polymers and methods for their preparation. For example, U.S. Pat. No. 5,095,054 describes thermoplastic polymer compositions which include destructurized starch blended with hydrophobic thermoplastic materials to provide overall thermoplastic formulations which show a surprising increase in all or part of their physical properties and behavior of their melts. In addition, much patent and other literature describes the use of poly(lactic acid), cellulosic polymers such as cellulose acetate, poly(3-hydroxybutyric acid)/poly(3-hydroxyvaleric acid) poly(lactic acid), cellulosic polymers such as cellulose acetate, poly(3-hydroxybutyric acid)/poly(3-hydroxyvaleric acid) copolymers, polycaprolactone, and the like, in degradable thermoplastic compositions.

While the development of new degradable plastics has proceeded rapidly, corresponding efforts to find effective, degradable compatibilizers have been lacking. The Lay et al. '054 patent mentions, as plasticizers for its compositions, generally water soluble materials such as low molecular poly(alkylene oxides), such as poly(ethylene glycols), poly(propylene glycols), poly(ethylenepropylene glycols); organic plasticizers of low molar masses, such as glycerol, pentaerythritol, glycerol monoacetate, diacetate or triacetate; propylene glycol, sorbitol, xylitol, mannitol, and sodium diethylsulfosuccinate.

As degradable polymers move to the commercial market they and their alloys will need to be physically modified (e.g. plasticized or compatibilized) to realize proper physical properties for specific applications. In general, the current battery of suggested plasticizers and compatibilizers will not impart physical properties to the degradable polymers that are desired for the various contemplated end uses. As a result, there exists an acute need and demand to find suitable plasticizers and compatibilizers for these degradable thermoplastics, which themselves would preferably be degradable so as not to diminish the degradability of the overall polymer formulation. It is this need for new plasticizers and compatibilizers and for new physically-modified degradable thermoplastic formulations to which the present invention is addressed.

SUMMARY OF THE INVENTION

The invention provides novel physically-modified degradable thermoplastic compositions, novel ester compositions useful as compatibilizers to effect such physical modifications, and processes for preparing the modified thermoplastic compositions and ester compositions. A feature of the invention is the discovery that partial ester compositions, that is, ester compositions which contain a substantial amount of unesterified carboxylic acid groups, advantageously modify degradable thermoplastic compositions containing degradable cellulosic polymers such as cellulose acetate without acid-induced breakdown of the polymers. Another feature of this invention is the discovery that citric acid triesters which are non-functionalized at the hydroxyl (—OH) group effectively modify degradable polyester compositions, and in so doing do not lead to degradation of the polyester backbone via attack by the free hydroxyl group. Another feature of the invention is the provision of degradable polyester-based thermoplastic compositions which are physically modified by citrate esters of alkoxy ether alcohols. Still other features of the invention relate to additional novel esters that are useful to physically modify degradable thermoplastic compositions.

In accordance with the above discussion, one preferred embodiment of the invention provides a physically-modified degradable thermoplastic composition which comprises a degradable cellulosic polymer physically modified by a partial ester of an aliphatic polycarboxylic acid (including di-, tri- and higher polycarboxylic acids). It has been discovered that unlike petroleum-based polymers, which are generally detrimentally affected by the acidity of partial esters, degradable cellulosic polymers are not detrimentally affected and are effectively physically modified by the partial esters. Although the present invention is not bound by any theory, it is believed that the polarity and hydrophilicity of the degradable cellulosic polymers. Effective plasticizers and compatibilizers (e.g. lubricants) for degradable cellulosic polymers are thus readily available by esterification reactions which need not be pushed with difficulty to completion as has historically been the case for petroleum-based polymers. Rather, esterifications can be terminated prior to completion to provide effective, inexpensive plasticizers and compatibilizers. Moreover, partial esters which are usable in the present invention can be prepared using reactants which are inexpensive and readily available, to result in a broad range of carboxylic acid esters having varied properties to meet specific demands or requirements. Compositions of this embodiment are illustrated herein using preferred partial citrate ester preparations as described below. It will be understood, however, that the preferred citrate ester compositions specifically identified below serve to illustrate the invention, and that similar partial esters of other polycarboxylic acids will be suitable and capable of use by those practiced in these arts.

Another preferred embodiment of the invention provides citric acid-based plasticizers or compatibilizers for degradable thermoplastic compositions. Compositions of this embodiment are isolated, substantially pure partial citric acid ester compositions encompassed by Formula I:

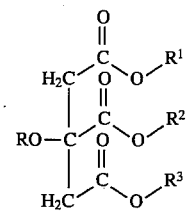

wherein

R=H, R'—CO— or Ph—R'$_n$—CO— wherein R' is a C$_1$ to C$_{18}$ aliphatic group, n is 0 or 1, and Ph is a phenyl group; aliphatic group, n is 0 or 1, and Ph is a phenyl group;

R$^1$, R$^2$, and R$^3$, which can be the same or different from each other, are selected from H, a C$_1$ to C$_{18}$ aliphatic group or alicyclic group, or R'(OR")$_m$— wherein R' is as defined above, R" is a $C_1$ to $C_8$ alkyl group, and m is an integer from 1 to 15; and wherein about 5% to about 40% of $R^1$, $R^2$, and $R^3$, taken together, are H (i.e. the carboxylic acid groups in the ester compositions are about 60% to about 95% esterified).

Partial esters of this embodiment can be readily prepared by esterifications in which it is unnecessary to achieve complete esterification of the citric acid starting material. Technical and economic disadvantages which are encountered during the latter stages of difficult complete esterifications can thus be avoided, while nonetheless providing efficacious plasticizers and compatibilizers which, despite their residual acidity, have proven to be stably incorporated into and to surprisingly avoid acid-induced degradation of cellulosic polymers.

Another preferred embodiment of the invention provides a physically-modified degradable thermoplastic composition which comprises a degradable polyester polymer physically modified by a citric acid ester wherein at least a portion of the ester groups are derived from an alkoxy ether alcohol. Esters of the instant inventive embodiment can exhibit a range of polarity and hydrophilicity which can be controlled to suit the needs of the particular thermoplast to be modified, by varying the alkoxy ether alcohols employed and the functionalization of the hydroxyl group of the citric acid. Novel alkoxy ether-based citric acid esters within the discussions below which are useful in preparing physically-modified degradable polyester compositions also constitute a part of the present invention.

Another aspect of the invention features the discovery that triesters of citric acid, wherein the hydroxyl group of the citric acid is left unfunctionalized, can effectively be used to physically modify degradable polyesters without causing substantial premature breakdown of the polyester backbone via attack by the acidic hydroxyl group. It is well known in this regard that polyesters are sensitive to attack and degradation by acidic hydroxyl groups of alcohols. It was therefore unexpected prior to the applicant's discovery that the citric acid triesters could be effectively used to physically modify degradable polyesters without causing deleterious premature degradation of the polyester backbone. Another preferred embodiment of the invention thus provides a physically-modified degradable thermoplastic composition which includes a degradable polyester resin physically modified by a citric acid triester in which the hydroxyl groups of the citric acid are non-functionalized (i.e. are left as free —OH groups).

Still other preferred embodiments of the invention relate to degradable thermoplastic compositions which include a degradable cellulosic or polyester polymer physically modified by hydroxyl-functionalized citric acid esters which are useful as plasticizers or compatibilizers (e.g. lubricants), preferably selected from acetyl trimethyl citrate, butyryl triethyl citrate, hexanoyl triethyl citrate, nonanoyl triethyl citrate, benzoyl triethyl citrate, butyryl tributyl citrate, and acetyl tristearyl citrate. These citric acid esters have varying properties making them suitable for use in a wide range of degradable thermoplastic formulations. Some are esters formed with relatively short-chain alcohols (e.g. $C_1$ to about $C_8$ alcohols), and are suited for use as plasticizers for hydrophilic polymers such as degradable cellulosics or polyesters. Others are esters formed with relatively long chain alcohols (e.g. above about $C_8$) and will be effective as combination plasticizers/lubricants or solely as lubricants. Esters having a combination of hydrophobic long chain hydrocarbon groups (e.g. about $C_8$ or above) at the carboxylic acid sites and a hydroxyl or acyl group at the citric acid headgroup are suitable as plasticizers and/or lubricants, and are particularly suited for the compatibilization of hydrophobic polymers, such as non-degradable petroleum-based polymers like polyolefins, with degradable hydrophilic polymers such as destructurized starch.

As to general preparative procedures, carboxylic acid (—COOH) groups can be esterified by reaction with alcohols to provide the desired ester groups. Such reactions can optionally be catalyzed by various known esterification catalysts which include for example metal organic catalysts (e.g. organic titanates as disclosed in U.S. Pat. Nos. 4,711,922 and 4,824,893) as well as acid catalysts such as mineral acids and organic sulfonic acids. Further, such esterifications can be conducted to provide partial or full esters. Hydroxyl groups of hydroxyl-containing carboxylic acids can also be converted to ester groups, for instance by reaction with acid halides or acid anhydrides. These reactions can likewise be conducted in the presence of esterification catalysts such as those mentioned above.

The invention thus provides physically-modified degradable thermoplastic compositions, plasticizers and compatibilizers for use in such compositions, and related methods of preparation and use. Preferred plasticizers and compatibilizers of the invention can be used to impart a wide range of desirable physical properties to compositions including degradable polymers, are themselves degradable, nontoxic and environmentally safe, and are preparable from readily available materials. Additional preferred embodiments, features and advantages of the present invention will be apparent from the following description.

DETAILED DESCRIPTION

For the purpose of promoting an understanding of the principles of the invention, reference will now be made to certain embodiments thereof and specific language will be used to describe the same. It will nevertheless be understood that no limitation of the scope of the invention is thereby intended, such alterations, further modifications and applications of the principles of the invention as illustrated herein being contemplated as would normally occur to one skilled in the art to which the invention relates.

In one aspect the present invention provides a degradable (biodegradable or photodegradable) thermoplastic composition comprising a degradable cellulosic polymer physically modified by a partial ester of an aliphatic polycarboxylic acid (i.e. an acid containing two or more —COOH groups). Representative carboxylic acids which are useful in the invention include aliphatic dicarboxylic acids, usually $C_2$ to about $C_{12}$ aliphatic dicarboxylic acids, including for example those of the formula HOOC—(CH2)$_p$—COOH where p is an integer from 0 to about 10, e.g. oxalic acid, malonic acid, succinic acid, glutaric acid, adipic acid, pimelic acid, suberic acid, azelaic acid or sebacic acid; aliphatic hydroxy-carboxylic acids, usually $C_2$ to about $C_{12}$ hydroxy-carboxylics, e.g. citric acid, glycolic acid, tartaric acid, hydroxycaproic acid, hydroxybutyric acid, etc.; as well as other poly-carboxylic acids including those having higher numbers of carboxylic acid groups.

Representative alcohols which can be used to esterify carboxylic acid moieties include for instance straight or branched chain aliphatic alcohols and alicyclic alcohols and alkoxy ether alcohols. Suitable alcohols for use in the invention thus include methanol, ethanol, n-propanol, isopropanol, n-butanol, isobutanol, t-butanol, pentanol, hexanol, cyclohexanol, heptanol, stearyl alcohol, oleyl alcohol, and the like, as well as alkoxy ether alcohols such as those having the formula R'(OR")$_m$—OH wherein R' is a C$_1$ to C$_{18}$ alkyl group, more preferably a C$_1$ to C$_6$ alkyl group, R" is a C$_1$ to C$_8$ alkyl group, and m is an integer from 1 to 15, more preferably 1 to 5. Alkoxy ether alcohols suitable for use in the invention include monoalkyl ethers of alkanediols, for instance 2-ethoxyethanol, 2-propoxyethanol, 2-butoxyethanol, etc. as well as longer chain materials such as 2-(2-propoxyethoxy)ethanol, 2-(2-butoxyethoxy)ethanol, etc. Alkoxy ether alcohols utilizable in the invention are available via routes well known to the art and literature, and are also commercially available from Union Carbide Corp. of New York, N.Y. and Eastman Chemical Products of Kingsport, Tenn. Preferred groups R'(OR")$_m$— will contain about 30 carbons or less and more typically about 15 carbons or less.

Hydroxyl groups of hydroxy-carboxylic acids used in the invention can also be converted to ester groups, generally by reaction with an acid halide or acid anhydride of an aliphatic, aromatic or combined aliphatic-aromatic carboxylic acid, typically having up to about 30 carbon atoms. Thus, suitable starting materials for use in this aspect of the invention include acid halides and anhydrides of acetic, propionic, butyric, pentanoic, hexanoic, heptanoic, nonanoic, etc., acids, on up to longer chain carboxylic acids such as oleic, linoleic and stearic acids. Benzoic acid halides or anhydrides are preferred aromatics for esterifying hydroxyl groups, although it will be understood that other similar aromatic carboxylic acid halides or anhydrides will be suitable and within the spirit and scope of the present invention.

Ester compositions of and for use in the invention can be formed using the following general preparative procedures. The conversion of hydroxyl groups of hydroxy-carboxylic acids to ester groups via reaction with carboxylic acid halides, for example of the formula R'—CO—X or Ph—R'$_n$—CO—X, or an acid anhydrides, for example of the formula R'—CO—O—CO—R' or Ph—R'$_n$—CO—O—CO—R'$_n$—Ph, wherein R' in these formulas is a C$_1$ to C$_{18}$ aliphatic group, n is 0 or 1, Ph is a phenyl group and X is a halogen, can be conducted in the presence of an esterification catalyst so as to form the corresponding ester group. Suitable esterification catalysts for these purposes will generally include mineral acid catalysts, and organic sulfonic acid catalysts. Such reactions are conveniently conducted by combining and reacting the starting materials over a period of time while maintaining the reaction temperatures below those which would substantially degrade the starting materials or products.

Carboxylic acid groups of the starting materials can be esterified by reaction with alcohols as described above, also optionally in the presence of an esterification catalyst. Preferred esterification reactions will generally be conducted at temperatures up to about 150° C., e.g. about 50° C. to about 150° C., and can be driven to completion to form complete esters, or terminated when the desired level of esterification has been achieved to form partial esters. The partial esters are more hydrophilic than their corresponding complete esters, the extent of which is dependent upon the level of esterification. This hydrophilic character can be capitalized upon when using the partial esters to physically modify compositions including degradable, relatively hydrophilic polymers such as starch or cellulosic polymers.

As indicated, petroleum-based polymers such as PVC are historically susceptible to decomposition during thermoforming in the presence of even low levels of acidity. For this reason the plastics industry has required over the years that the acid neutralization number of a plasticizer be no greater than 0.2 mg KOH/gram sample. However, in accordance with the present invention, partial esters retaining substantial amounts of acidity can effectively physically modify degradable polymers such as cellulosic polymers such as cellulose acetate, cellulose diacetate, cellulose acetate butyrate, cellulose acetate propionate, and cellulose acetate phthalate, while not leading to substantial breakdown of the polymers at temperatures such as those encountered during thermoforming operations. Thus, the polarity of the plasticizers, lubricants and compatibilizers of the invention can be adjusted by varying esterification levels, in order to obtain optimum properties in the resulting degradable thermoplastic compositions. In this regard, preferred partial ester compositions for use in this embodiment of the invention will typically have from about 60% to about 95% of their available carboxylic acid groups esterified, more preferably about 75% to about 95%, and most preferably about 75%–85%.

The partial esters, in practice, are actually mixtures of all of the possible combinations of carboxyl and ester groups. The partial dicarboxylic acid esters referred to herein are mixtures of mono- and diesters with perhaps some of the dicarboxylic acid starting material, while partial esters of tricarboxylic acids are mixtures of mono-, di- and triesters, possibly with some of the original acid. It is, of course, possible to separate the various species in such mixtures; however, the mixtures are readily utilizable as such, and separation of the various species is disadvantageous when commercial quantities are contemplated.

The above-detailed embodiment of the invention can be illustrated using preferred partial citrate ester compositions which constitute a further embodiment of the invention. Thus, provided are isolated, partial citric acid ester compositions encompassed by Formula I:

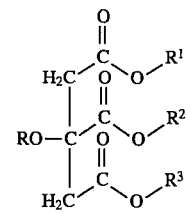

wherein

R=H, R'—CO— or Ph—R'$_n$—CO— wherein R' is a C$_1$ to C$_{18}$ aliphatic group, n is 0 or 1, and Ph is a phenyl group;

R$^1$, R$^2$, and R$^3$, which can be the same or different from each other, are selected from H, a C$_1$ to C$_{18}$ aliphatic group or alicyclic group, or R'(OR")$_m$— wherein R' is as defined above, R" is a C$_1$ to C$_8$ alkyl group, and m is an integer from 1 to 15; and wherein about 5% to about 40% of R$^1$, R$^2$, and R$^3$, taken together, are H (i.e. the carboxylic acid groups in the ester compositions are about 60% to about 95% esterified).

These partial citric acid esters will typically include at least citric acid diesters and triesters (i.e. being esterified at two, and three of the carboxylic acid sites, respectively), and potentially also monoesters and some starting acid. For example, preferred citric acid ester compositions will contain about 50–55% of compounds in which all three carboxylic acid sites are esterified, about 35–45% of compounds in which two carboxylic acid sites are esterified, and about 0–10% of compounds in which one or none of the carboxylic sites is esterified. As indicated above, these partial citric acid esters can also optionally be esterified at the hydroxyl group.

Representative substituents, starting materials and methods for preparing esters encompassed by the invention are set forth in the discussions above, and for the sake of brevity will not be repeated in their entirety here. Generally, however, they include corresponding acid halides or anhydrides of the acyl groups R (i.e. acid halides of the formula R'—CO—X or Ph—R'$_n$—CO—X or acid anhydrides of the formula R'—CO—O—CO—R' or Ph—R'$_n$—CO—O—CO—R'$_n$—Ph wherein the values for R', X, Ph, and n are as previously defined) and corresponding alcohols of the groups $R^1$, $R^2$ and $R^3$ (i.e., $C_1$ to $C_{18}$ aliphatic or alicyclic alcohols or alkoxy ether alcohols of the formula $R^1(OR")_m$—OH).

The invention also provides degradable thermoplastic compositions including degradable polyesters physically modified by alkoxy ether alcohol-based citric acid esters. Preferred citric acid esters for use in this feature of the invention are encompassed by Formula I above wherein:

R=R'—CO— or Ph—R'$_n$—CO— wherein R' is a $C_1$ to $C_{18}$ alkyl group, n is 0 or 1, and Ph is a phenyl group; and $R^1$, $R^2$, and $R^3$, which can be the same or can differ from one another, are each a $C_1$ to $C_{18}$ aliphatic or alicyclic group, or $R'(OR")_m$— wherein R' is as defined above, R" is a $C_1$ to $C_8$ alkyl group, and m is an integer from 1 to 15;

with the proviso that at least a portion of the groups $R^1$, $R^2$ or $R^3$, taken together, are $R'(OR")_m$—.

Suitable alkoxy ether alcohols for use in this aspect of the invention include, for example, monoalkyl ethers of alkanediols, for instance 2-ethoxyethanol, 2-propoxyethanol, 2-butoxyethanol, etc. and longer chain materials such as 2-(2-propoxyethoxy)ethanol, 2-( 2-butoxyethoxy)ethanol, etc. As previously indicated, alkoxy ether alcohols which can be used in the invention are available via routes known to the art and literature or commercially from Union Carbide Corp. and Eastman Chemical Products. Preferred groups $R'(OR")_m$— will contain about 30 carbons or less and more typically about 15 carbons or less. Additional suitable ester groups, esterification agents and preparative procedures for esters encompassed by Formula I are set forth in the discussions above.

Representative esters of this embodiment are prepared in the specific Examples below, including tri-2-ethoxyethyl citrate, acetyl tri-2-ethoxyethyl citrate, tri-2-(2-butoxyethoxy)ethyl citrate, acetyl tri-2-(2-butoxyethoxy)ethyl citrate, tri-2-butoxyethyl citrate, acetyl tri-2-butoxyethyl citrate, butyryl tri-2-ethoxyethyl citrate, butyryl tri-2-(2-butoxyethoxy)ethyl citrate and butyryltri-2-butoxyethyl citrate. It will be understood that these are preferred esters used to highlight and illustrate this embodiment of the invention, and that additional esters as encompassed by formula I above.

Representative degradable polymers with which the alkoxy ether alcohol-based esters of this embodiment may be used include, for example, degradable, relatively hydrophilic polymers including degradable polyesters such as poly(lactic acid) polymers, poly(3-hydroxybutryic acid)/poly(3-hydroxyvaleric acid) copolymers, polycaptrolactone polymers, and the like, which can be compounded at temperatures at which the alkoxy ether alcohol-based esters are stable against degradation.

The present invention also provides degradable thermoplastic compositions which include a degradable polyester polymer physically modified by a composition including a non-hydroxyl-functionalized citric acid triester (i.e. a citric acid triester composition in which hydroxyl groups of the citric acid starting material are left unmodified and thus occur as free —OH groups). Despite the known susceptibility of polyesters to breakdown in the presence of alcohols, the modified degradable polyesters in this aspect of the invention demonstrate surprisingly little if any breakdown resulting from attack by the unfunctionalized citric acid hydroxyl group and instead retain their desired physical properties.

Advantageous citric acid triesters for use in this aspect of the invention are encompassed by Formula II:

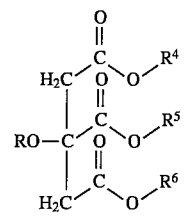

wherein $R^4$, $R^5$, and $R^6$, which may be the same as or different from each other, are selected from a $C_1$ to $C_{18}$ aliphatic or alicyclic group, or $R'(OR")_m$— wherein R' is as defined above, R" is a $C_1$ to $C_8$ alkyl group, and m is an integer from 1 to 15.

Suitable alcohols and procedures for esterifications to provide the groups $R^4$, $R^5$, and $R^6$ include those discussed above in connection with $R^1$, $R^2$ and $R^3$. Suitable degradable polyesters include those noted above, that is, poly(lactic acid) polymers, poly(3-hydroxybutryic acid)/poly(3-hydroxyvaleric acid) copolymers, polycaptrolactone polymers, and the like.

Another embodiment of the invention provides degradable thermoplastics (polyesters or cellulosics) which are physically-modified by a hydroxyl-functionalized citrate ester composition such as acetyl trimethyl citrate, butyryl triethyl citrate, hexanoyl triethyl citrate, nonanoyl triethyl citrate, benzoyl triethyl citrate, butyryl tributyl citrate, acetyl tristearyl citrate, and acetyl trimethyl citrate. The varied properties of these esters make them suitable for use in a wide range of polymeric formulations. Esters formed with relatively short-chain alcohols (e.g. $C_1$ to about $C_8$ alcohols) are suited for use as plasticizers for hydrophilic polymers such as degradable cellulosics or polyesters. Esters formed with relatively long-chain alcohols (e.g. above about $C_8$) will be effective as combination plasticizers/lubricants or solely as lubricants. Esters having a combination of hydrophobic long chain hydrocarbon groups (e.g. about $C_8$ or above) at the carboxylic acid sites and a hydroxyl or acyl group at the citric acid headgroup are suitable as plasticizers and/or lubricants, and are particularly suited for the compatibilization of hydrophobic polymers, such as non-degradable petroleum-based polymers like polyolefins, with degradable hydrophilic polymers such as destructurized starch.

In accordance with each of the embodiments of the invention discussed heretofore, compatibilizers and/or plasticizers can be conventionally incorporated into thermoplastic formulations in suitable amounts and at temperatures at which the materials do not substantially degrade, e.g. suitable temperatures as set forth in the specific Examples below. Generally, the amount of the compatibilizer and/or plasticizer incorporated will be effective to achieve the desired physical modification (e.g., lubricate or plasticize). In typical thermoplastic formulations of the invention, the physically-modifying ester will be included in an amount ranging up to about 60% by weight of the formulation, more typically in the range of about 5% to about 30% by weight of the formulation. Thermoplastic formulations of the invention can also include other, conventional ingredients, which can serve additional functions in the formulation and/or can serve to improve the workability of the formulation at temperatures suitable for use of the inventive plasticizers and compatibilizers herein. For example, these additional ingredients can include dyes, pigments, fillers, other plasticizers and/or lubricants, antioxidants, light stabilizers, free-radical scavengers, and the like. Inventive thermoplastic formulations described herein can be used in conventional molding, film-forming and other operations to provide plastic articles, sheet material, films, etc., which are also considered to be within the scope of the present invention.

The invention will now be more particularly described with reference to the following specific Examples. It will be understood that these Examples are illustrative and not limiting of the invention.

PART I: PREPARATION OF ESTERS

Example 1

Preparation of n-Hexanoyltriethyl Citrate (HTEC)

n-Hexanoyltriethyl citrate was prepared in the following manner. Triethyl citrate (TEC) (91 g, 0.33 moles) was charged to a stirred reactor, and 0.20% concentrated sulfuric acid, based on weight of the triethyl citrate, was added. This mixture was heated to 70° C. and 0.36 moles (49 g) of hexanoyl chloride was added slowly by a metering device over a period of 30 minutes to 1 hour, with the temperature being maintained at 70° C. to 75° C. Provision was made to collect the by-product hydrogen chloride that evolved from the reaction by absorbing in water or an alkali solution. Stirring was continued, and the temperature held at 70° C.±5° C., with the reaction mixture being sampled hourly and analyzed for completeness of reaction by gas chromatography. Once substantially all triethyl citrate was reacted (typically 2–3 hours), the mixture was washed at 60° C. to 70° C. with a large excess of 10% aqueous sodium carbonate to neutralize the residual acidity. The neutralization wash was discarded and the oil washed twice with water, vacuum dried to 100° C. and filtered. A yield of 86% of theory, based on triethyl citrate charged, of colorless oil with a neutralization number of 0.04 was obtained. The material had a specific gravity of 1.0737 at 25° C. and refractive index of 1.4399 at 25° C. If color was formed in the ester prepared in this manner, bleaching was performed, for example sodium hypochlorite alone or in combination with peracetic acid, hydrogen peroxide, or accelerated light bleaching.

Example 2

Preparation of n-Nonanoyltriethyl Citrate (NTEC)

The procedure of Example 1 was repeated, except replacing hexanoylchloride with nonanoyl chloride, to prepare n-nonanoyltriethyl citrate. The product was an oil having a specific gravity (25° C.) of 1.0422 and a R.I. (25° C.) of 1.4425. The product assayed at 95.5% purity, had a neutralization number of 0.5 and a color (APHA) of about 75. Product yield was 94% of theory based on the triethyl citrate charge.

Example 3

Preparation of Partial Ethyl Esters of Citric Acid (EC)

Partial ethyl esters of citric acid were prepared in a simple, non-catalyzed scheme. Ethanol was charged to a reactor set for simple distillation take-off. While agitating, citric acid was charged to the ethanol in an amount equivalent to twice the weight of the ethanol present. The mixture was heated to 120° C. to 125° C. slowly, removing ethanol and water of reaction in the process. Once at 120° C., ethanol was metered to the reaction at a rate such as to maintain controlled distillation of ethanol/water and the 120° C. to 125° C. temperature. The reaction was followed by titrating acidity regularly and stopping ethanol feed when the neutralization number reached about 215 for 2 acid units esterified (EC-2.0), or 100 for 2.5 acid units esterified (EC-2.5). Reaction time to 2 acid units esterified was 24 to 30 hours in laboratory preparations. Vacuum was slowly applied while maintaining 120° C. to remove the residual ethanol and water. After stripping, the final neutralization numbers were 225–235, and 110–120, respectively for the two stages.

Example 4

Preparation of Partial Isopropyl Esters of Citric Acid

The procedure of Example 3 was repeated except using isopropyl alcohol instead of ethanol, to prepare partial isopropyl esters of citric acid having an average of 2 esterified acid groups per molecule and an average of 2.5 esterified acid groups per molecule.

Example 5

Preparation of Partial n-Butyl Esters of Citric Acid

Partial n-butyl esters of citric acid were prepared by the general procedure of Example 3, with the exception that the butyl ester preparation employed toluene reflux to remove water of reaction without removing the butyl alcohol. This scheme eliminates the need for feed through of the alcohol component. Toluene may be added to the reaction mixture during reaction as needed to maintian boil-up without exceeding the maximum temperature of 125° C. A selected degree of esterification was accomplished by stopping the reaction at the proper acid value, and removing excess butanol. The acid value was taken 10 to 15 points below the desired number before stopping the reaction because of the concentrating effect of removing excess butanol. Calculated acid values, for example, are 184.5 for 2.0 degrees of substitution (D.S.) (BC-2.0), and 84.5 for 2.5 D.S. (BC-2.5). Vacuum stripping at 110° C. was used to remove excess butanol. Yields were about 85%, the product being a viscous, light yellow liquid.

Example 6

Preparation of Benzoyl-triethyl Citrate (BTEC)

Using the procedures of Example 1 except substituting benzoyl chloride for hexanoyl chloride and reacting at 105° C. instead of 70° C., the title compound was prepared in 77% of theoretical yield.

Example 7

Preparation of Tri-[2-(2-butoxyethoxy)ethyl] Citrate (TBEEC)

The esterification method used in this Example involved use of an azeotroping agent and a moisture trap, with reflux back to the reactor to assist in removal of water and slight fractionation, in the form of a 30 cm Vigreaux column to help retain the alcohol component in the reactor. 2-(2-butoxyethoxy) ethanol was charged to the reactor at a 10% excess, then citric acid was then charged while stirring. Catalyst, 0.2% of sodium bisulfate, based on the citric acid charge, and toluene were added and heating begun. The moisture trap was filled with toluene. The reaction was run at 125° C. with toluene being added as needed to maintain boilup without the temperature going significantly above this point. A typical charge was 192 g citric acid, 535 g 2-(2-butoxyethoxy) ethanol, 3.8 g sodium bisulfate, and 200 ml toluene to a one liter flask. The reaction was continued until the citric acid content was below 1% as determined by titration of a sample of the reaction mixture. The final crude reaction mixture was vacuum steam stripped at 110° C. and 25–40 mm Abs pressure to remove the excess alcohol and toluene, neutralized, bleached, water washed, dried, and filtered. The resulting product was orange colored, having a refractive index of 1.45448 at 25° C., specific gravity of 1.0744 at 25° C. and a neutralization number of 0.27. Yield was 68.5%.

Example 8

Preparation of Acetyl-tri-2-(2-butoxyethoxy)ethyl citrate, (ATBEEC)

A portion of the crude reaction mixture of Example 7 (tri-2-(2-butoxyethoxy)ethyl citrate) was taken after vacuum steam stripping to remove alcohol and toluene. This ester was acetylated at the hydroxyl as follows. Sulfuric acid, 0.2%, was added to the ester, whereafter it was heated to 75° C. and acetic anhydride added slowly while stirring and allowing the reactants to warm to 105°–110° C. A 10% excess of acetic anhydride was used to insure complete acetylation. After acetylating, the reaction was cooled to 75° C., neutralized with aqueous sodium carbonate, chemically bleached, water washed (2 times), vacuum steam stripped and filtered. Yield was 76% of theory, color was 90 APHA, neutralization number was 0.17, specific gravity 1.0646 and refractive index 1.4495, both at 25° C.

Example 9

Preparation of Tri-n-propoxyisopropyl citrate (TPPC)

The title compound was prepared using the general procedure of Example 7, except substituting n-propoxyisopropyl alcohol for 2-( 2-butoxyethoxy) ethanol.

Example 10

Preparation of Acetyl Tri-n-propoxyisopropyl citrate (ATPPC)

The title compound was prepared by acetylating TPPC using the general procedure set forth in Example 8.

Example 11

Preparation of Tri-n-butoxyisopropyl citrate (TBPC)

The title compound was prepared using the general procedure of Example 7, except substituting n-butoxyisopropyl alcohol for 2-( 2-butoxyethoxy) ethanol.

Example 12

Preparation of Acetyl Tri-n-butoxyisopropyl citrate (ATBPC)

The title compound was prepared by acetylating TBPC using the general procedure set forth in Example 8.

Example 13

Preparation of Tri-2-butoxyethyl citrate (TBEC)

The title compound was prepared using the general procedure of Example 7, except substituting 2-butoxyethanol for 2-(2-butoxyethoxy) ethanol.

Example 14

Preparation of Acetyl Tri-n-butoxyisopropyl citrate (ATBEC)

The title compound was prepared by acetylating TBPC using the general procedure set forth in Example 8.

Example 15

Preparation of Acetyl Tri-n-stearyl citrate (ATSC)

Using the general procedure set out in Example 7, except not using the Vigreaux column, tristearyl citrate was prepared, the excess stearyl alcohol removed by vacuum steam stripping, and the ester acetylated using the general procedure described in Example 8. The product had a color of Gardner 4 (Varnish Scale), a neutralization number of 0.16, and a melting point of 39.7° C.

EXAMPLE 16

Preparation of Tri-2-ethoxyethylcitrate (TEEC)

The procedure of Example 7 was repeated except using 2ethoxyethanol instead of 2-butoxyethanol, to provide the title compound. The product assayed at 97.6% purity, at a neutralization number of 0.12, a R.I. (25° C.) of 1.4513, a Sp. Gr. (25° C.) of 1.323, and a color (APHA) of approximately 30.

Example 17

Preparation of Acetyl-tri-2-ethoxyethyl citrate (ATEEC)

Tri-2-ethoxyethylcitrate, prepared as in Example 16, was acetylated using the general procedure set out in Example 8. The title compound so prepared assayed at 95.6% purity, had a neutralization number of 0.3, a R.I. (25° C.) of 1.4475 a Sp. Gr. (25° C.) of 1.1325, and a color (APHA) of approximately 50.

Example 18

Preparation of Butyryltributyl Citrate (BTBC)

Tributyl Citrate (available from Morflex, Inc., Greensboro N.C.) was butyrylated using the procedure of Example 8 and substituting butyric anhydride for acetic anhydride, to produce the title compound.

Example 19

Preparation of Tricyclohexyl Citrate (TCHC)

Tricyclohexyl citrate was prepared by esterifying citric acid with cyclohexanol, using esterification procedures generally as described in the Examples above.

Example 20

Preparation of Acetyltrimethyl Citrate (ATMC)

Acetyltrimethyl citrate was prepared by esterification with methanol and acetylation using procedures generally as described in the Examples above.

PART II: PREPARATION OF THERMOPLASTIC FORMULATIONS

Plasticizers and compatibilizers prepared as in the Examples above were evaluated in poly(lactic acid) (PLA) and cellulose acetate (CA). Generally, the following criteria were used in determining the level of compatibility. First, visual examination of the material during and after the attempted fusion; second, examination of the Plasticorder time-torque curves (L vs. t); third, determination of whether or not a continuous pressed sheet could be obtained under the stated conditions; fourth, examination of the plaque immediately for exudation; fifth, the plaques were stored at ambient temperature and tested periodically for exudation, i.e., blocking.

The equipment for the evaluations included a EPL-V5501 Plasticorder (C. W. Brabender), a CR5 Chromatopac 2-channel recorder (Shimadzu) for torque measurement/graph, a 60 ml Sigma mixer equipped with roller blades (C. W. Brabender), and a hydraulic press with 20 mil thickness press plates. The resin and plasticizer were weighed into a 250 ml beaker and mixed with a spatula. The Plasticorder temperature and rpm were preset at fixed levels (140°–170° C. for PLA and 190°–205° C. for CA, 50 rpm unless otherwise denoted). The CR5 recorder was started and the mixed material added to the Sigma mixer. The material was mixed for 8 minutes unless otherwise noted, with torque chart recording. The material was then immediately removed from the mixer and cooled. A pressed plaque was then prepared for exudation studies. The results are set forth in Tables 1 and 2, in which "X" denotes compatibility under the stated conditions.

TABLE 1

COMPATIBILITY OF CITRATE ESTERS WITH CELLULOSE ACETATE

| ESTER | % IN BLEND | PFT* VISUAL | PFT* L vs. t | PRESSED SLAB | EXAMINATION AT 0 DAY | EXAMINATION AT 7 DAYS |
|---|---|---|---|---|---|---|
| TEC | 15 | X | X | X | X | X |
| TEC | 30 | X | X | X | X | X |
| EC 2.5 | 30 | X | X | X | X | X |
| EC 2.5 | 45 | X | X | X | X | X |
| EC 2.0 | 30 | X | X | X | X | X |
| EC 2.0 | 45 | X | X | X | X | X |
| BC 2.5 | 30 | X | X | X | X | X |
| BC 2.5 | 45 | X | X | X | X | X |
| BC 2.0 | 30 | X | X | X | X | X |
| BC 2.0 | 45 | X | X | X | X | X |
| ATMC◇ | 30 | X | X | X | X | X |

*Plasticorder Fusion Test
◇ PFT at 25 rpm
X indicates compatibility

TABLE 2

COMPATIBILITY OF CITRATE ESTERS WITH POLYLACTIC ACID

| ESTER | % IN BLEND | PFT* VISUAL | PFT* L vs. t | PRESSED SLAB | EXAMINATION AT 0 DAY | EXAMINATION AT 7 DAYS |
|---|---|---|---|---|---|---|
| TEC | 10 | X | X | X | X | X |
| TEC | 20 | X | X | X | X | Block** |
| TPPC | 10 | X | X | X | X | X |
| TPPC | 20 | X | X | X |  | Block |
| ATPPC | 10 | X | X | X | X | X |
| ATPPC | 20 | X | X | X |  | Block |
| TBPC | 10 | X | X | X | X | X |
| TBPC | 20 | X | X | X |  | Block |
| ATBPC | 10 | X | X | X | X | X |
| ATBPC | 20 | X | X | X |  | Block |
| TBEC | 10 | X | X | X | X | X |
| ATBEC | 10 | X | X | X | X | X |
| TBEEC | 10 | X | X | X | X | X |
| TCHC◇ | 10 | X | X | X | X | X |
| ATMC◇ | 18 | X | X | X | X | X |

*Plasticorder Fusion Test
**Denotes exudation of the plasticizer at level tested.
◇ PFT at 25 rpm
X indicates compatibility The data set forth in Table 1 demonstrate that the EC and BC partial esters (2.0 and 2.5), like the complete esters, were compatible with the cellulosic polymer and are utilizable as plasticizers in degradable thermoplastic compositions. In addition, no premature breakdown of the cellulose acetate was noted when the partial esters were used. The invention thus enables the physical modification of cellulosic degradable thermoplastic compositions using partial esters which are more readily and economically available than their complete ester counterparts.

Reference to Table 2 reveals that the polar, alkoxy ether-based citrate esters, TPPC, ATPPC, TBPC, ATBPC, TBEC, ATBEC and TBEEC, are suitable plasticizers for degradable polyester resins such as poly(lactic acid). It will be appreciated that exudation of the plasticizers which occurred at higher levels in these tests could be, if desired, addressed by the inclusion of talc or other suitable fillers. Table 2 also demonstrates that the non-hydroxyl-functionalized citrate triesters, TEC, TPPC, TBPC, TBEC, TBEEC, and TCHC, like the hydroxyl-functionalized citric acid esters, successfully plasticize degradable polyesters such as poly(lactic acid). Furthermore, no degradation of the polyester backbone was noted despite the presence of the free hydroxyl groups in the plasticizers.

While the invention has been illustrated and described in detail in the foregoing description, the same is to be considered as illustrative and not restrictive in character, it being understood that only the preferred embodiments have been described and that all changes and modifications that come within the spirit of the invention are desired to be protected.

What is claimed is:

1. A physically-modified degradable thermoplastic composition which comprises a degradable cellulosic polymer physically modified by a partial ester of citric acid having the formula I:

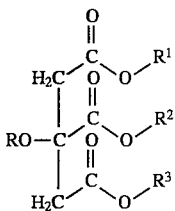

wherein

R=H, R'—CO— or Ph—R'$_n$—CO— wherein R' is a $C_1$ to $C_{18}$ aliphatic group, n is 0 or 1, and Ph is a phenyl group;

R$^1$, R$^2$ and R$^3$, which may be the same or different from each other, are selected from H, a $C_1$ to $C_{18}$ aliphatic or alicyclic group, or R'(OR")$_m$— wherein R' is as defined above, R" is a $C_1$ to $C_8$ alkyl group, and m is an integer from 1 to 15; and wherein about 5% to about 40% of R$^1$, R$^2$ and R$^3$, taken together, are H.

2. The thermoplastic composition of claim 1, wherein the degradable polymer is cellulose acetate.

3. The thermoplastic composition of claim 1 wherein R=H or R'—CO—.

4. The thermoplastic composition of claim 3 wherein R' is a $C_1$ to $C_6$ alkyl group.

5. The thermoplastic composition of claim 1 wherein R=Ph— R'$_n$—CO—.

6. The thermoplastic composition of claim 5 wherein n=0.

7. The thermoplastic composition of claim 5 wherein n=1.

8. The thermoplastic composition of claim 7 wherein R' is a $C_1$ to $C_6$ alkyl group.

9. The thermoplastic composition of claim 1 wherein R$^1$, R$^2$ and R$^3$ are H or a $C_1$ to $C_{18}$ alkyl group.

10. The thermoplastic composition of claim 9 wherein R$^1$, R$^2$ and R$^3$ are H or a $C_1$ to $C_6$ alkyl group.

11. The thermoplastic composition of claim 1 wherein R$^1$, R$^2$ and R$^3$ are H or R'(OR")$_m$—.

12. The thermoplastic composition of claim 11 wherein R' and R" are each a $C_1$ to $C_6$ alkyl group.

13. The thermoplastic composition of claim 12 wherein m is 1 to 5.

14. A physically-modified degradable thermoplastic composition which comprises a degradable polyester polymer physically modified by a citric acid ester of Formula I:

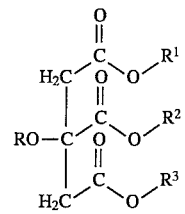

wherein

R=H, R'—CO— or Ph—R'$_n$—CO— wherein R' is a $C_1$ to $C_{18}$ aliphatic group, n is 0 or 1, and Ph is a phenyl group;

R$^1$, R$^2$, and R$^3$, which may be the same or different from each other, are selected from a $C_1$ to $C_{18}$ aliphatic or alicyclic group, or R'(OR")$_m$— wherein R' is as defined above, R" is a $C_1$ to $C_8$ alkyl group, and m is an integer from 1 to 15; and with the proviso that at least a portion of the groups R$^1$, R$^2$ or R$^3$, taken together, are R'(OR")$_m$—.

15. The thermoplastic composition of claim 14 wherein the degradable polyester is a poly(lactic acid) polymer or a poly(3-hydroxyvaleric acid)/poly(3-hydroxybutyric acid) copolymer.

16. The thermoplastic composition of claim 15 wherein the degradable polyester is a poly(lactic acid) polymer.

17. The thermoplastic composition of claim 14 wherein R$^1$, R$^2$ and R$^3$ are each of the formula R'(OR")$_m$.

18. A physically-modified degradable thermoplastic composition comprising a degradable polyester resin physically modified by a non-hydroxyl-functionalized citric acid triester.

19. The thermoplastic composition of claim 18 wherein the degradable polyester is a poly(lactic acid) polymer or a poly(3-hydroxyvaleric acid)/poly(3-hydroxybutyric acid) copolymer.

20. The thermoplastic composition of claim 19 wherein the degradable polyester is a poly(lactic acid) polymer.

21. The thermoplastic composition of claim 18 wherein the citric acid triester has the formula II:

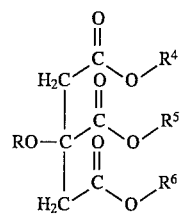

wherein R$^4$, R$^5$, and R$^6$, which may be the same as or different from each other, are selected from a $C_1$ to $C_{18}$ aliphatic or alicyclic group, or R'(OR")$_m$— wherein R' is as defined above, R" is a $C_1$ to $C_8$ alkyl group, and m is an integer from 1 to 15.

* * * * *

UNITED STATES PATENT AND TRADEMARK OFFICE
CERTIFICATE OF CORRECTION

PATENT NO. : 5,556,905  
DATED : September 17, 1996  
INVENTOR(S) : Edward P. Frappier et al.

Page 1 of 2

It is certified that error appears in the above-identified patent and that said Letters Patent is hereby corrected as shown below:

In col. 8, Fig. II, please delete " 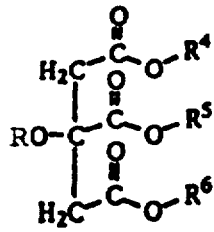 "

and insert in lieu thereof

-- 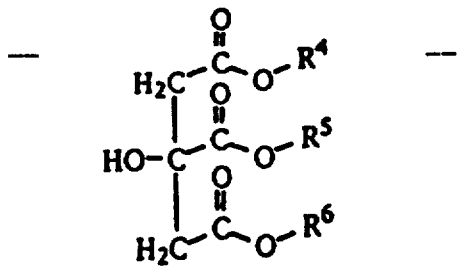 --

. Please also make this same change to Fig. II in col. 16, claim 21.

UNITED STATES PATENT AND TRADEMARK OFFICE
CERTIFICATE OF CORRECTION

PATENT NO.  : 5,556,905
DATED       : September 17, 1996
INVENTOR(S) : Edward P. Frappier et al.

It is certified that error appears in the above-identified patent and that said Letters Patent is hereby corrected as shown below:

In col. 12, line 51, please delete "2ethoxyethanol" and insert in lieu thereof --2-ethoxyethanol--.

Signed and Sealed this

Ninth Day of June, 1998

BRUCE LEHMAN

*Attest:*

*Attesting Officer*  *Commissioner of Patents and Trademarks*